Figure 1:
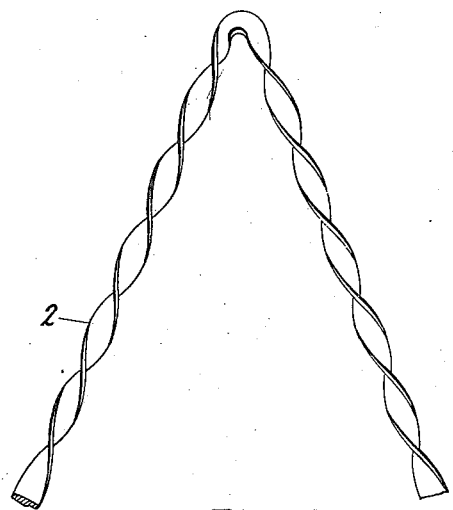

Aug. 7, 1923.

J. W. HARRIS 1,463,813

ELECTRON EMITTING CATHODE AND PROCESS OF MANUFACTURING THE SAME

Filed Dec. 29, 1916

Inventor:
Jonathan W. Harris.
by ╱╲╱╲╱╲╱╲╱, Att'y.

Patented Aug. 7, 1923.

1,463,813

UNITED STATES PATENT OFFICE.

JONATHAN W. HARRIS, OF MONTCLAIR, NEW JERSEY, ASSIGNOR TO WESTERN ELECTRIC COMPANY, INCORPORATED, OF NEW YORK, N. Y., A CORPORATION OF NEW YORK.

ELECTRON-EMITTING CATHODE AND PROCESS OF MANUFACTURING THE SAME.

Application filed December 29, 1916. Serial No. 139,532.

*To all whom it may concern:*

Be it known that I, JONATHAN W. HARRIS, a citizen of the United States, residing at Montclair, in the county of Essex and State of New Jersey, have invented certain new and useful Improvements in Electron-Emitting Cathodes and Processes of Manufacturing the Same, of which the following is a full, clear, concise, and exact description.

This invention relates to filamentary cathodes serving as a source of electrons in a thermionic device of the audion type, and to the process of manufacturing such cathodes. Under operating conditions an electric current is passed through the cathode to heat the same to a suitable temperature, the higher the temperature of the cathode, the greater the electron emission therefrom. But if a cathode is maintained at a high temperature it soon burns out and its emissivity at the time it burned out may have dropped to about sixty per cent of what the emissivity initially was. If the cathode is run at a comparatively low temperature, its life will be longer, and the emission may keep its initial value throughout the life of the cathode. But these advantages which result from maintaining a low cathode temperature are offset by the disadvantage that the emission from the cathode will also be low.

An object of the present invention is to provide a cathode which for the same length of life may be run at much higher temperatures, and which for the same temperature will last much longer than prior cathodes.

The invention makes use of the method disclosed and claimed in the application of Carl D. Hocker "Electron emitting cathode and the process of making the same," Serial No. 131,858, filed November 17, 1916, in which it is described that a cathode coating may be made by mixing a noble metal such as platinum in the form of ammonium chloroplatinate with an alkaline earth oxide such as barium oxide or strontium oxide, or with both barium oxide and strontium oxide. This coating is made into a pasty or fluid condition by the addition of a suitable fluid such as water. A platinum or platinum-iridium filament is coated with the coating mixture and baked. If desired the steps of coating and baking may be repeated to provide a coat having any desired thickness.

The improvement which the present invention makes on the above process is the addition of a calcium compound to the coating mixture. The calcium compound may be calcium oxide, calcium chloride, calcium hydroxide, or any other compound of calcium which will burn down to the oxide "CaO" when heated in air. A filament made by the improved process then has platinum, barium oxide, calcium oxide and strontium oxide in its coat. To show that the characteristics of the improved filament are out of all proportion to what might be expected from a knowledge of the characteristics of filaments coated with calcium oxide or with platinum, barium oxide, and strontium oxide, the following table is given. No specific results of a filament coated only with calcium oxide are given, but such a filament does not give as good results as filaments No. 2 and No. 3. Filaments No. 1 were made by the process disclosed and claimed in the patent to Nicolson & Hull, No. 1,209,324, patented December 19, 1916, Electron-emitting cathode and the process of manufacturing the same. As disclosed therein a filament having a multiple coating comprising alternate layers of barium oxide and strontium oxide, is made by alternately coating a filament with barium resinate and strontium hydroxide, and in baking the coating. Filaments No. 2 contained barium oxide, strontium oxide and platinum in the coat and were made by the Hocker process above described. Filament No. 3 is the improved filament made according to the present invention.

| Cathode temperature degrees centigrade. | Life of cathode in hours. | | |
|---|---|---|---|
| | No. 1. | No. 2. | No. 3. |
| 1140 | 14 | 33 | 1500 |
| 1095 | 24 | 60 | 2021 |
| 1025 | 316 | 60 | 3270 |
| 975 | 208 | 756 | 3270 |
| 920 | 1500 | 2000 | 3270 |

The temperature values are believed to be correct within 30 degrees. Each value given in the table is the average of tests made on four tubes. If a larger number of tests had been made the value 208 hours for filament No. 1 would probably have been larger. The values 3270 hours corresponding to the cathode temperatures degrees centigrade, 920, 975 and 1025, do not represent the entire life of these filaments as they are still in operation and have not yet burned out. The table shows that the improved filaments No. 3 have a length of life, especially at high temperatures, which is very much greater than the other filaments No. 1 and No. 2.

Figure 2:
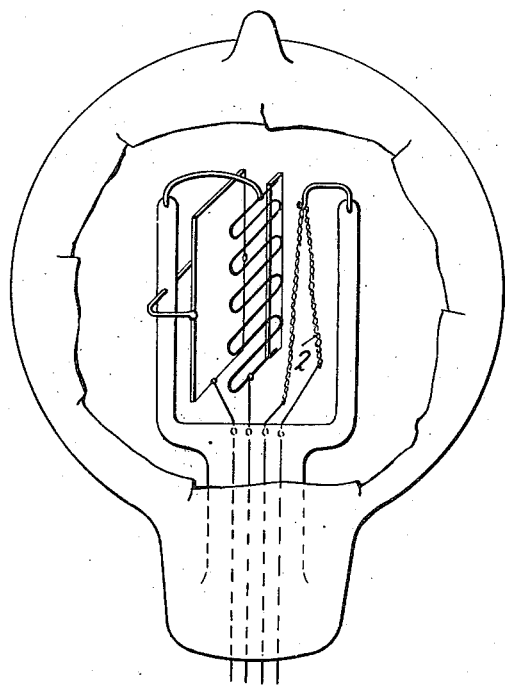

Fig. 1 of the drawing shows a twisted form of filament that may be used; Fig. 2 illustrates a thermionic device of the audion type in which the improved filament is mounted.

It is proposed to use a filament core of platinum or one of platinum alloyed with other metals of the platinum group, i. e., iridium, rhodium, palladium, osmium, ruthenium.

One way of making a cathode according to the present invention is to suspend filament 2, which may be twisted as shown in the drawings, from spaced electrodes connected to a suitable source of electricity. Equal molecular parts of barium oxide, strontium oxide and calcium oxide, are added to three molecular parts of platinum in the form of $(NH_4)_2PtCl_6$. The ingredients are mixed with a suitable fluid such as water and applied as a paste to the filament. The coat is then baked on the filament by heating the same to a suitable temperature. A convenient way of baking the coat is to pass electric current through the filament. When the first coat is baked, the filament is allowed to cool and a second coat is applied and baked. This process of applying a coat and baking the same is preferably repeated from three to five times or until a coat of suitable thickness has been provided. The coated filament should be finally baked in air at a temperature of about 1000 degrees centigrade for about two hours.

Another way of making the improved filament is to apply the coating ingredients separately and in any order, and in making each layer or coating, and in finally baking as indicated above.

The effect of adding platinum to the coating by either of the above processes is to provide a filament which has platinum in the elemental state or in the form of a compound distributed throughout its coat.

What is claimed is:

1. The process of manufacturing an electron emitting cathode which consists in applying to an electric conductor coatings of mixed barium, strontium and calcium compounds, distributing a platinum compound between said coatings and reducing the barium, strontium and calcium compound to their oxides, and the platinum compound to platinum.

2. The process of manufacturing an electron emitting cathode which consists in applying to an electric conductor a coating containing barium, strontium, calcium and a noble metal, baking said coating, in repeating the steps of coating and baking, and in finally baking the coated filament in air for about two hours at a temperature of about one thousand degrees centigrade.

3. An electron emitting cathode comprising an electric conductor, coatings therefor comprising mixed barium, strontium and calcium oxides, and noble metal coatings between said first-named coatings.

4. An electron emitting cathode comprising an electric conductor, coatings therefor comprising mixed barium, strontium and calcium oxides, and platinum coatings distributed between said first-mentioned coatings.

5. An electron emitting cathode, comprising an electric conductor, and a multiple coating therefor consisting of superposed coatings of mixed barium, strontium and calcium oxides, and platinum coatings interspersed between the recited coatings.

In witness whereof, I hereunto subscribe my name this 28th day of December A. D., 1916.

JONATHAN W. HARRIS.